United States Patent
Blanc et al.

(10) Patent No.: US 10,088,248 B2
(45) Date of Patent: Oct. 2, 2018

(54) FLUID CIRCULATION CONDUIT

(75) Inventors: Jean-Pierre Blanc, Nice (FR); Alain Goering, Nice (FR)

(73) Assignee: COMPAGNIE MEDITERRANEENNE DES CAFES, Carros (FR)

( * ) Notice: Subject to any disclaimer, the term of this patent is extended or adjusted under 35 U.S.C. 154(b) by 1720 days.

(21) Appl. No.: 13/129,696

(22) PCT Filed: Nov. 16, 2009

(86) PCT No.: PCT/EP2009/065211
§ 371 (c)(1),
(2), (4) Date: Jun. 8, 2011

(87) PCT Pub. No.: WO2010/057844
PCT Pub. Date: May 27, 2010

(65) Prior Publication Data
US 2011/0240267 A1 Oct. 6, 2011

(30) Foreign Application Priority Data
Nov. 18, 2008 (FR) ..................... 08 57824

(51) Int. Cl.
F28F 13/12 (2006.01)
F28F 3/12 (2006.01)
F28F 3/14 (2006.01)
F28F 13/06 (2006.01)
A47J 31/54 (2006.01)

(52) U.S. Cl.
CPC ............. *F28F 13/06* (2013.01); *A47J 31/542* (2013.01); *F28F 13/12* (2013.01)

(58) Field of Classification Search
CPC ...... F28F 1/10; F28F 1/40; F28F 1/405; F28F 3/12; F28F 3/14; F28F 13/06; H01L 23/473; A47J 31/00
USPC ............. 165/109.1, 168, 169, 170; 426/433; 99/302 R, 307, 322, 279
See application file for complete search history.

(56) References Cited

U.S. PATENT DOCUMENTS

| | | | | |
|---|---|---|---|---|
| 1,922,838 | A | * | 8/1933 | Bossart ..................... F28F 1/02 165/177 |
| 2,017,201 | A | | 10/1935 | Bossart et al. |
| 3,769,959 | A | | 11/1973 | Parker |
| 4,508,957 | A | * | 4/1985 | Rocchitelli ............. B60S 1/481 137/341 |

(Continued)

FOREIGN PATENT DOCUMENTS

DE 94 18 641 U1 3/1995
DE 20 2007 005 738 U1 7/2007
(Continued)

OTHER PUBLICATIONS

Russian Office Action, dated Nov. 21, 2013, from corresponding RU application.
(Continued)

*Primary Examiner* — Jason Thompson
(74) *Attorney, Agent, or Firm* — Young & Thompson

(57) ABSTRACT

A fluid circulation conduit 1 for use as a heating device in electrical household appliances, includes an element for creating turbulence in the fluid circulating in its inner volume 2. Application of the device is to electrical household appliances equipped with a heating device.

26 Claims, 7 Drawing Sheets

(56) References Cited

U.S. PATENT DOCUMENTS

| | | | | |
|---|---|---|---|---|
| 4,888,465 | A * | 12/1989 | Hoffmann | A47J 31/545 |
| | | | | 392/467 |
| 5,070,937 | A * | 12/1991 | Mougin | F28F 1/40 |
| | | | | 138/38 |
| 6,000,466 | A * | 12/1999 | Aoyagi | F28F 1/40 |
| | | | | 165/133 |
| 6,187,274 | B1 | 2/2001 | Nilsson | |
| 6,351,384 | B1 * | 2/2002 | Daikoku | F28F 3/02 |
| | | | | 165/80.3 |
| 6,442,341 | B1 | 8/2002 | Wu | |
| 6,816,670 | B1 * | 11/2004 | Renau | F24H 1/121 |
| | | | | 392/467 |
| 7,017,651 | B1 * | 3/2006 | Wilson | H01L 23/473 |
| | | | | 165/109.1 |
| 7,254,030 | B2 * | 8/2007 | Chiba | H01L 23/473 |
| | | | | 361/710 |
| 7,286,752 | B2 | 10/2007 | Gourand | |
| 7,385,821 | B1 * | 6/2008 | Feierbach | H01L 23/4332 |
| | | | | 165/104.33 |
| 2001/0006105 | A1 * | 7/2001 | Watanabe | F28D 1/0316 |
| | | | | 165/177 |
| 2002/0005274 | A1 * | 1/2002 | Beeck | F01D 5/187 |
| | | | | 165/109.1 |
| 2002/0153130 | A1 * | 10/2002 | Okamoto | B23K 20/122 |
| | | | | 165/170 |
| 2004/0184237 | A1 * | 9/2004 | Chang | F28F 13/12 |
| | | | | 361/699 |
| 2006/0191675 | A1 * | 8/2006 | Fletcher | F28F 3/022 |
| | | | | 165/172 |
| 2007/0209788 | A1 | 9/2007 | Jing et al. | |
| 2008/0116246 | A1 * | 5/2008 | Rigal | B23K 20/021 |
| | | | | 228/193 |
| 2009/0145581 | A1 * | 6/2009 | Hoffman | F28F 1/40 |
| | | | | 165/80.3 |
| 2010/0090336 | A1 * | 4/2010 | Yoshida | H01L 23/473 |
| | | | | 257/717 |
| 2010/0139631 | A1 * | 6/2010 | Geskes | F28F 1/40 |
| | | | | 123/568.12 |
| 2010/0276135 | A1 * | 11/2010 | Morino | B23P 15/26 |
| | | | | 165/185 |

FOREIGN PATENT DOCUMENTS

| | | | | |
|---|---|---|---|---|
| DE | 10 2007 011 635 A1 | 9/2007 | | |
| ES | 2 259 265 A1 | 9/2006 | | |
| FR | 2855359 A1 | 11/2001 | | |
| JP | WO 2007032056 A1 * | 3/2007 | | F28F 3/022 |
| RU | 2137053 C1 | 9/1999 | | |
| UA | 15410 U | 3/2004 | | |
| WO | 02-084197 | 10/2002 | | |

OTHER PUBLICATIONS

International Search Report, dated Jan. 12, 2010, from corresponding PCT application.

* cited by examiner

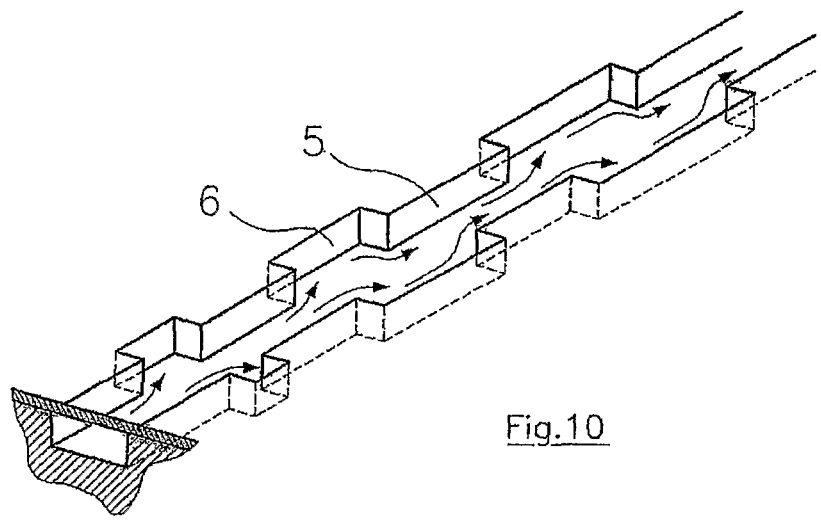
Fig.10
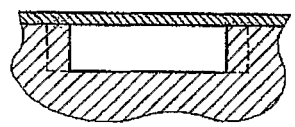
Fig.11
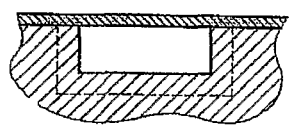
Fig.12
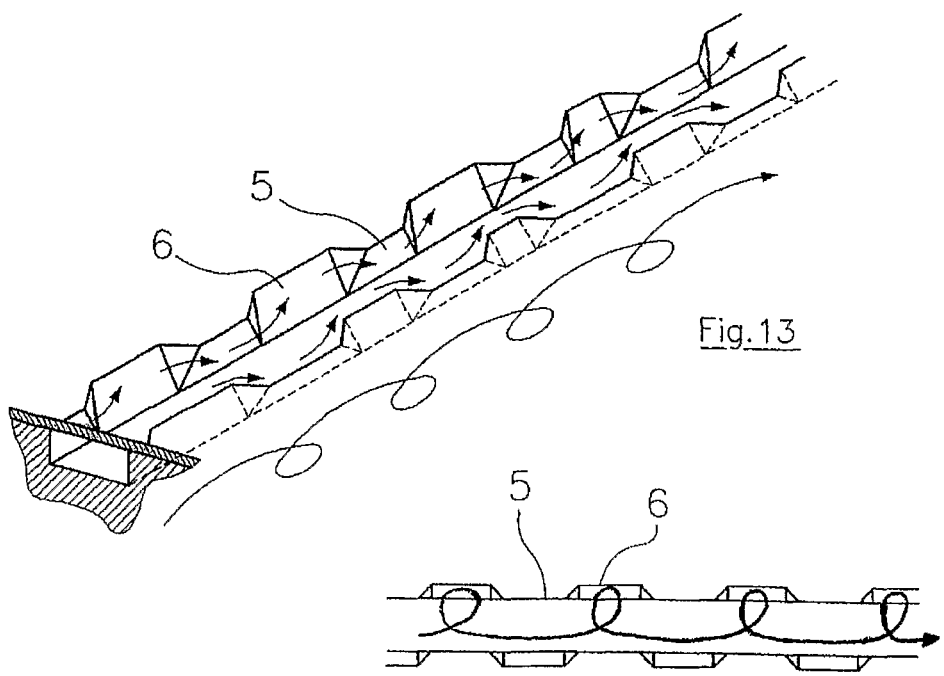
Fig.13
Fig.14

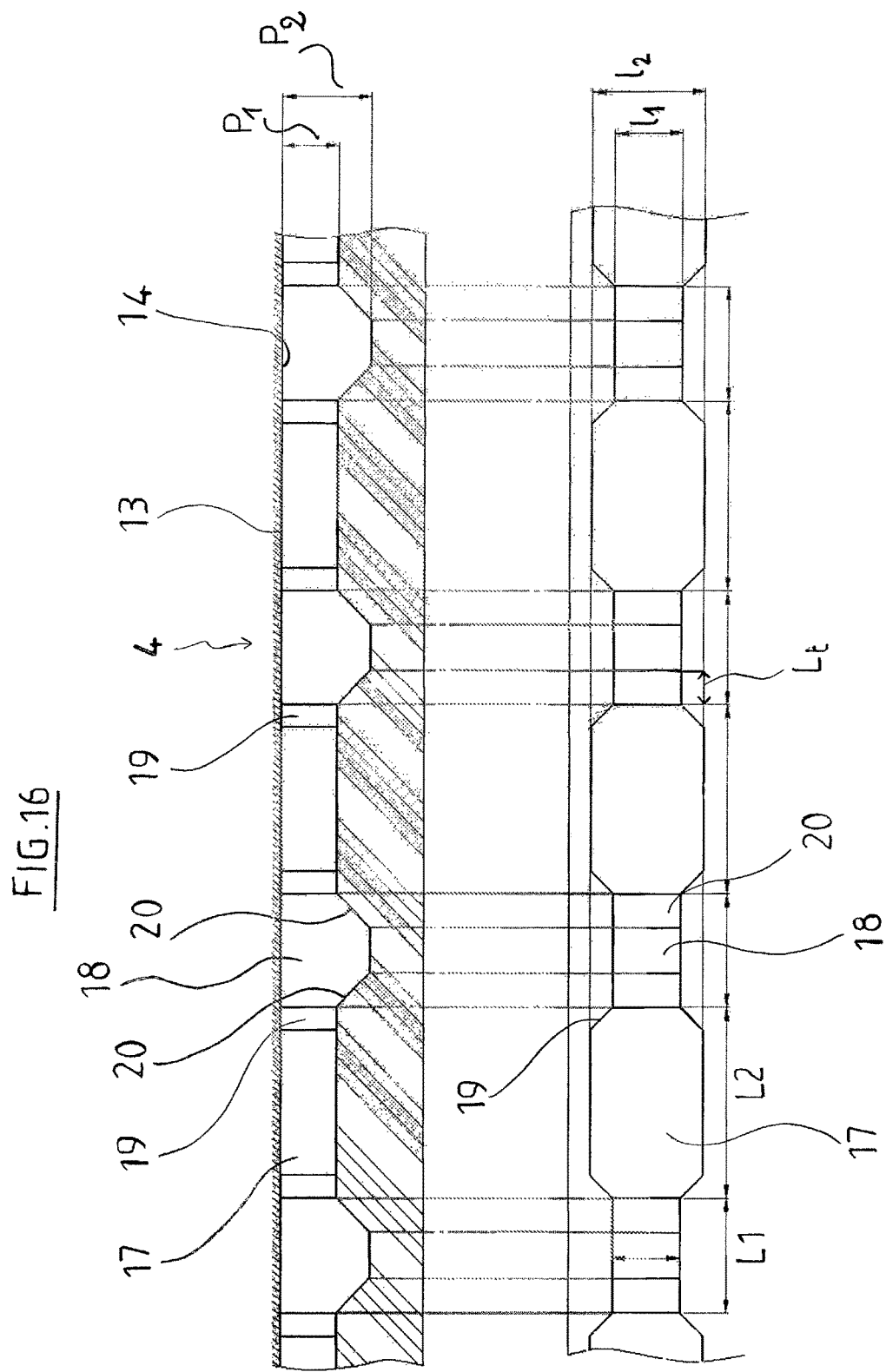

FLUID CIRCULATION CONDUIT

BACKGROUND OF THE INVENTION

The present invention relates to a fluid circulation conduit. It finds a particular application in heating systems installed on household equipment. This includes in particular machines for preparing beverages by the infusion of a product such as ground coffee or chopped tea leaves, or by the dissolving of a product, especially in granulated form. A preferred application is to be found in espresso-type coffee machines.

In this latter indicative field of use, the fluid, in this case water, has to be heated to levels which ensure maximum extraction of the aromatic substances found in ground coffee. Devices called boilers are provided for this purpose. They have in common a circuit through which the heated water transits and means for heating the water, generally an electrical heating resistance. As an example, the water temperature of 20° C. at the intake is increased to a temperature at the outlet of between 70 and 100° C.

One of the shortcomings of conventional boilers is the time that is required to increase the temperature of the water circulating through the circuit. Indeed, conventional boilers are large consumers of electricity, especially when used on household appliances that are repeatedly started and stopped. This is particularly true in the field of coffee machines that are stopped and started several times in the course of one day. In addition to their high energy consumption, conventional boilers are slow to heat up, leading to a waiting time that a user may find annoying.

More sophisticated boilers with faster means of heating have recently been proposed. These are equipped with means that ensure that the temperature increase generally takes place in less than 10 seconds. In particular, techniques using thick film screen-printed resistances ensure a quasi immediate response by the boiler heating means. However, technical limitations have been observed, especially regarding temperature setting.

Thus, a need has arisen to improve the heating capacity of the fluid transiting through a conduit so as to obtain the best heating time/temperature performance.

SUMMARY OF THE INVENTION

The present invention falls within this scope and proposes an improved fluid circulation conduit that includes means for creating turbulence in the fluid transiting through the conduit.

Indeed, most recent boilers have limited use insofar as the liquid flows through them relatively quickly which, when combined with violent heating means, leads to lamination of the fluid flow creating a very steep temperature gradient between the fluid close to the heating zone and the fluid furthest away.

To counter this, this invention creates turbulence, at least in certain parts of the fluid circulation conduit. Mixing then occurs and this causes the temperature inside the conduit to even out.

In the case of boiler type devices installed on machines for preparing beverages using an infusion process, the conduits transporting the fluid (generally water) have a small diameter and it is not altogether obvious that on this scale it would have any merit since the problems encountered with laminar flows are generally considered inapplicable at these dimensions.

The applicant has noted with surprise that this invention make it possible to achieve much higher temperature settings.

Other goals and advantages will appear during the description which follows, which presents various nonrestrictive embodiments of the invention.

Before proceeding to a detailed description, it has to be remembered that the invention concerns a conduit transporting fluid for a heating device installed on a household appliance, characterized in that it comprises means for creating turbulence in the fluid circulating inside the conduit.

According to preferred but non exhaustive variants, this conduit is such that:
- the means for creating the turbulence consist of surfaces in relief on the inner wall of the conduit,
- the surfaces in relief consist of surface projections towards the inside of the conduit,
- the surface projections include studs,
- the shape of the studs may be either cylindrical, truncated or pyramidal,
- the surfaces in relief include recessed surfaces on the inner wall of the conduit,
- the surfaces in relief include changes to the conduit sections,
- the changes of section include variations in the width and/or depth,
- the changes of section include a series of sections with different shapes,
- the conduit includes at least two zones, one zone being larger and shallower than the other zone,
- the zones have a rectangular section,
- the two zones are connected by a width and depth transition section,
- the transitional section comprises a transitional zone in width and a transitional zone in depth,
- the surfaces in relief are evenly spaced along the conduit,
- the surfaces in relief have inclined sides,
- the said sides have between 20 and 60° inclination,
- the inner wall includes a heat exchange part that is able to co-act with the heating means and in which the surfaces in relief are formed outside the heat exchange part,
- at least part of the surfaces in relief are configured to deviate the fluid in the direction of the heat exchange part,
- the heat exchange part is in the form of a plate equipped with a thick film screen-printed resistance on its outer face,
- the conduit is formed by the assembly of parts comprising a base hollowed out to form a conduit channel and a cover formed by plate,
- the general form of the conduit is serpentine with bends,
- the device constitutes a heating device for use on a machine for making drinks by infusion,
- the conduit section is less than 10 mm$^2$,
- the conduit section is between 3 and 6 mm$^2$.

The invention also relates to a fluid heating device for household appliances equipped with at least one conduit according to the invention.

BRIEF DESCRIPTION OF THE DRAWINGS

The drawings attached are given as examples and are not restrictive. They represent only one embodiment of the invention and will make it possible to understand it easily.

FIGS. 10 to 12 show another variant using a conduit with a section that varies according to its length.

FIGS. 13 and 14 present another possibility.

FIG. 16 shows, on a longitudinal section, another possibility of conduit formation and FIG. 17 shows a top view of the recessed part of the conduit.

DETAILED DESCRIPTION OF THE PREFERRED EMBODIMENTS

Figure 1:
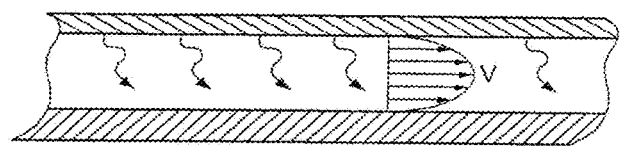
FIG. 1 is a schematic diagram showing the flow of a liquid in a conventional conduit.

FIG. 1 shows a conventional conduit with walls that define the inner volume within which the fluid, in particular water, circulates during the heating phase. Heating occurs by transferring the heat energy via one of the conduit walls. In the example shown, it is the upper wall that performs this function and the heat exchange is shown diagrammatically by the slightly curved arrows. Heating takes place by the transfer of calorific energy through one of the walls of the conduit. In the case shown, the upper wall has this function and the heat transfer is shown schematically by slightly curved arrows.

This figure also shows diagrammatically the type of flow currently observed with a rate of flow gradient in relation to the depth of the conduit from the boundary layers (those situated in contact with the edges of the conduit) towards the centre of the conduit where the rate of flow is maximum. The applicant has observed with surprise that despite the rapid flow and the effects of convection that are to be expected due to severe heating, lamination of the flow does take place. In particular, a temperature difference of about 40° C. is observed between the layers of fluid near the zone of heating and the layers furthest away. Consequently, the average temperature of the heated fluid is considerably limited.

Figure 2:
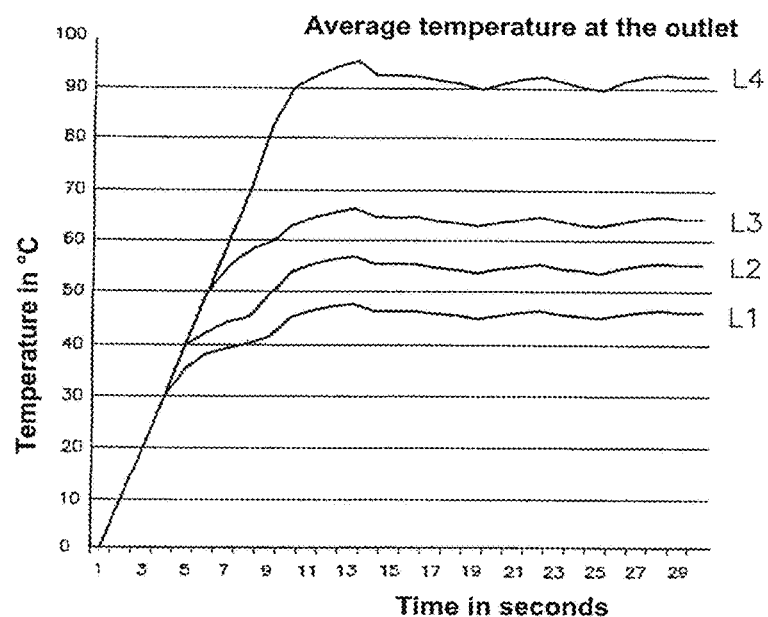
FIG. 2 is a schematic diagram of the technological jump made by the invention in terms of the temperatures that may be obtained when applied to a boiler on an espresso coffee machine.

FIG. 2 presents the time/temperature curves for fluid heating observed in conduits on a conventional configuration (curves L1, L2, L3) and secondly, with the invention (curve L4). It is clearly observed that the conventional conduits reach their technical limit below 65° C. whereas the invention makes it possible to achieve mean temperatures of 95° C. These observations were made by measuring the temperature of water circulating in the boiler of espresso coffee machines at a pressure of 16 bars, the temperature sensor being situated at the mid-height of a conduit with rectangular section.

Moreover, the curves were obtained for conduits with the same section (6 mm$^2$) and same length (750 mm). Curve L1 corresponds to a conduit with rectangular section S1 having the largest height and the smallest width. Conversely, curve L3 corresponds to the conduit with rectangular section S3 having the smallest height and the largest width. Curve L2 concerns an intermediate example in terms of the width/height ratio. Curve L4 corresponds to a conduit with typical section L3 (section S3) but with means for creating turbulence in the flow. Even if reducing the height of the conduit improves the outlet temperature as shown on curves L1, L2 and L3, the limit is reached at around 65° C. It can be clearly seen by the temperature jump between L3 and L4, that the turbulence induced by the invention breaks up the stream lamina and improves the capacity of the fluid to absorb the heat energy.

In the context of this invention, the term conduit means a section of the fluid circuit. The conduit may constitute all the fluid circuit or just one or several parts of it. For example, it may be positioned in the zone of maximum fluid heating and not be present in the fluid inlet and outlet zones in the circuit. There may also be different conduits according to the invention distributed along the circuit. These various possibilities and other variants are also covered by the invention. Various conduits according to the invention can be also distributed along the circuit. These various possibilities and other alternatives fall within the scope of this invention.

Moreover, neither the inner nor the outer shape and the method of construction are restrictive embodiments of the invention. The other possibilities that can be envisaged are as follows:

a conduit with inner rectangular or circular section
   a conduit formed by the assembly of parts for example with:
      a base part formed by a hollowed out channel and a cover such as a plate through which for instance heat exchange can take place, in particular by means of a thick film screen-printed resistance located on the cover face opposite the conduit.
      more than two parts, each one constituting a wall of the conduit. For example four parts can form the four edges of a rectangular conduit.
      an overall shape ensuring rectilinear circulation of the fluid, or in serpentine form, with bends, helical or spiral.

These examples are not restrictive.

In order to achieve satisfactory heating, the invention causes turbulence to occur in the liquid flow. The purpose is to break up the lamination that the applicant has observed on existing devices.

Throughout this description, the expression "surface in relief" extends in the widest sense to any variation in the shape on the inner walls of the conduit that constitute a geometrical discontinuity.

A preferred embodiment consists in creating the means for causing the turbulence by using surfaces in relief on the inner wall of the conduit.

Figure 3:
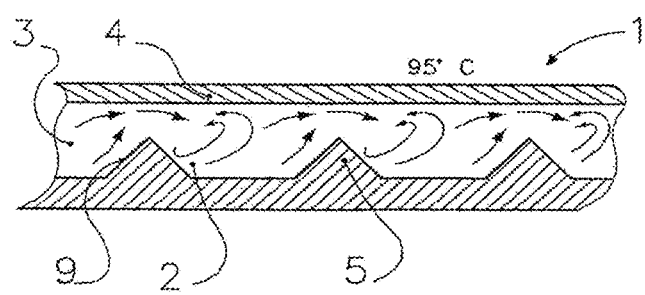
FIGS. 3 and 4 show a first possibility embodiment of the invention.
Figure 4:
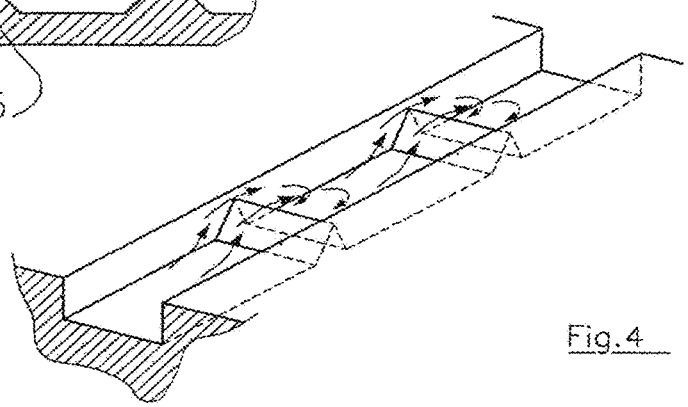

A first solution is shown on FIGS. 3 and 4 at the level of which the conduit includes a heat exchange part 4, for instance in the form of a plate equipped with a thick film resistance on its outer face, a flow 3 circulating inside volume 2 of conduit 1. According to this configuration, the means used to create the turbulence are surfaces in relief and more especially projections towards the inside of volume 2. In this case they have a triangular section (this shape is not restrictive) capable of forming inclined walls 9 configured to deviate flow 3. The deviation obtained is shown by the arrows on FIG. 3. The creation of turbulence is shown diagrammatically in the form of arrows. One advantageous possibility is to shape sides 9 so that flow 3 is diverted in the direction of heat exchange part 4. This configuration enhances disruption of the flow 3 lamina, especially at the boundary layer. The sides may be inclined at between 20 and 60°, although these figures are purely indicative.

Figure 5:
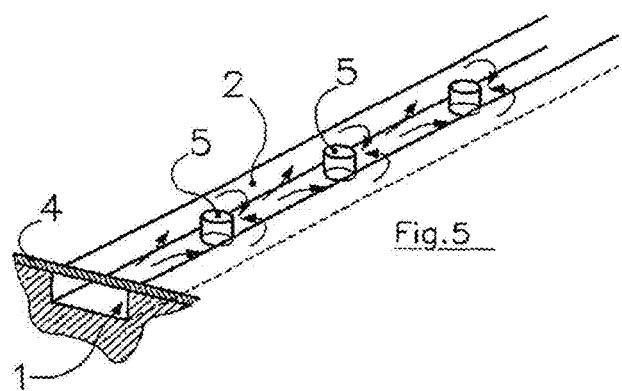
FIGS. 5 and 6 illustrate another variant of the invention and FIG. 7 shows a slight modification.
Figure 7:
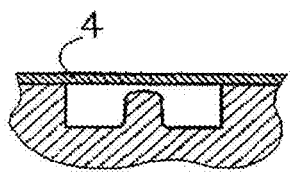
Figure 6:
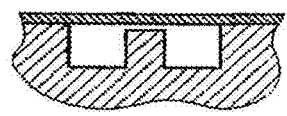

Another surface projection 5 is shown on FIGS. 5 and 6 in the form of studs extending inside volume 2 of the conduit from one of its walls opposite heat exchange part 4. Here again, the studs ensure that turbulence breaks up the flow lamina. In the case shown, the studs are cylindrical but various forms can be used, such as the one shown in FIG. 7 in the form of a semi-conical embossed shape. The studs may extend up to at least half the height of the conduit.

Figure 8:
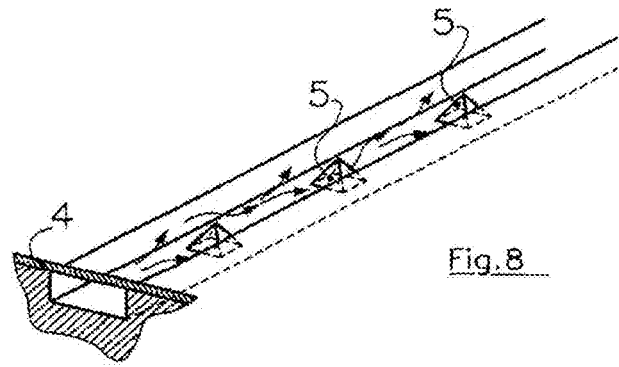
FIGS. 8 and 9 show another embodiment.
Figure 9:
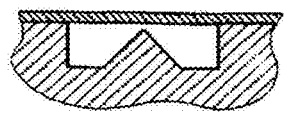

FIGS. 8 to 9 show a variant consisting of surface projections 5 with pyramidal shape.

In other cases, recesses 6 are formed on at least one part of the walls of conduit 1, an example of which is shown on FIG. 10. On this figure, recesses 6 and projections 5 are alternated in order to create sudden widenings of the section of conduit 1. FIG. 11 shows a zone whose length or section is maximum and FIG. 12 shows a zone of a length with narrower section. Advantageously, the change of section takes place with a discontinuity so that widening or narrowing occurs sharply to encourage the development of turbulence. In particular right angles may be created at section changes.

FIGS. 13 and 14 show an alternative to the previous case with alternating widenings of conical shapes and transitional inclined sides between the wide sections and the narrow sections. This configuration encourages helicoidal streaming of the flow inside the conduit.

It should be noted that the change of section is shown here with appreciably rectangular section conduits, but this case is not restrictive. In addition, the change of section may occur in width, in height (called depth further on) or in combinations of both. The change of section also includes a series of sections of different shapes.

According to one possibility, an attempt is made to retain a certain dimensional continuity of the conduit section. This is useful to avoid throttling or large pressure variations along the conduit. Advantageously, the size of the section in the zones equipped with the means for developing turbulence is retained. This means that the changes of shape do not generate dimensional changes in the section or that the variation of the section dimensions is overall −/+20% around a mid-value.

As regards devices for heating boilers for electrical household appliances, such as a boiler for an infusion drinks making machine, a section of conduit between 3 $mm^2$ and 10 $mm^2$ is an advantageous feature. Preferably, the section is between 4 and 6 $mm^2$, 4.5 $mm^2$ in particular. These latter values are dimensional choices at which one observes a maximum rise in the temperature of the fluid to be heated, generally water.

The above-mentioned dimensions conform to the water flowing through the boiler of an espresso coffee machine. The volume of water transiting through this channel corresponds to the volume of the infused drink, that is to say between 10 ml and 150 ml. The time required to deal with this volume of drink is no longer than 1 minute. The flow is established at between 100 and 200 ml per minute and more especially around 150 ml/minute.

With reference to FIGS. 15 to 18, a configuration of the conduit is shown in the context of the heating device.

Figure 15:
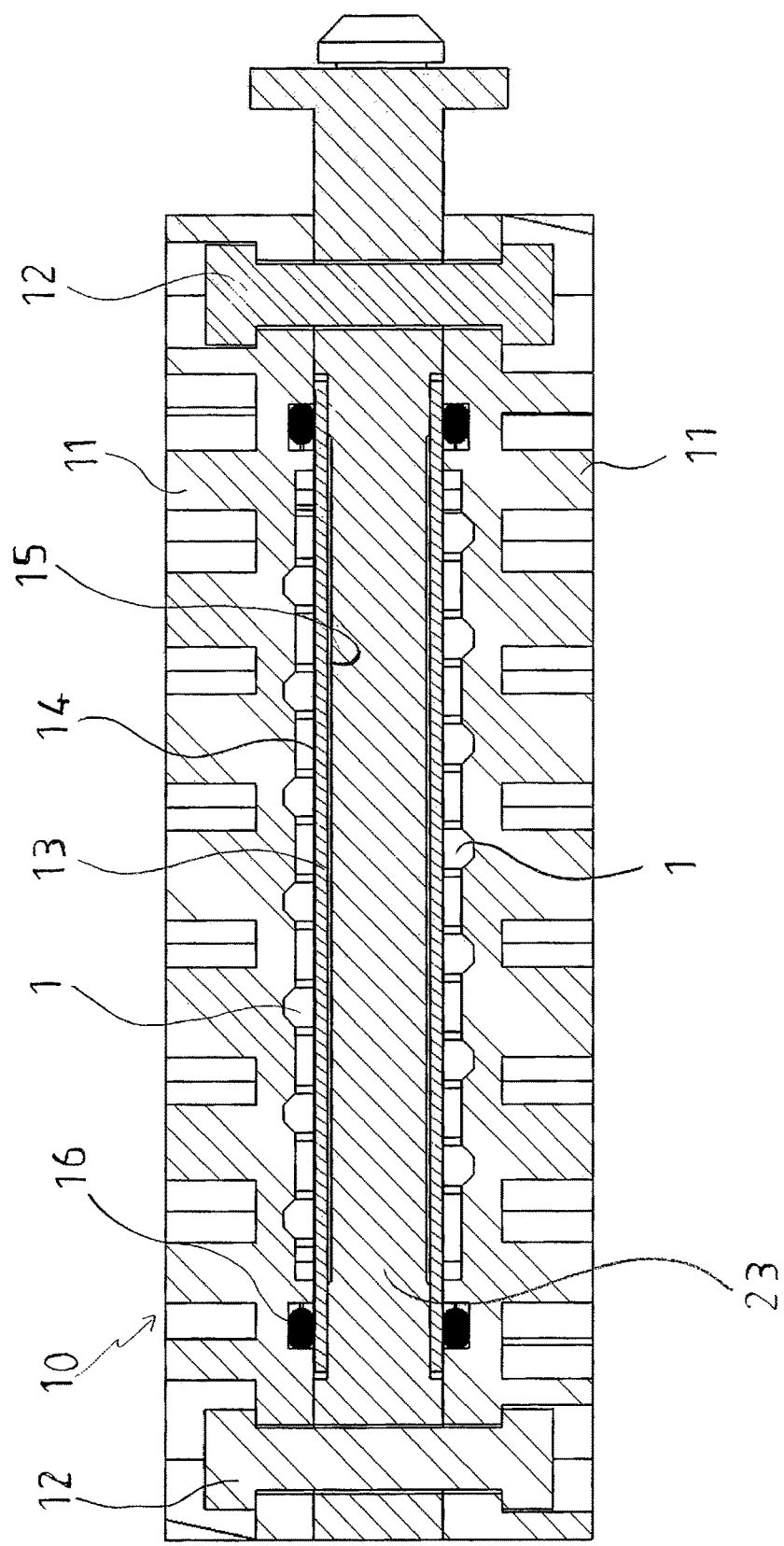
FIG. 15 is a sectional view of a boiler equipped with a pair of conduits according to the invention.
Figure 18:
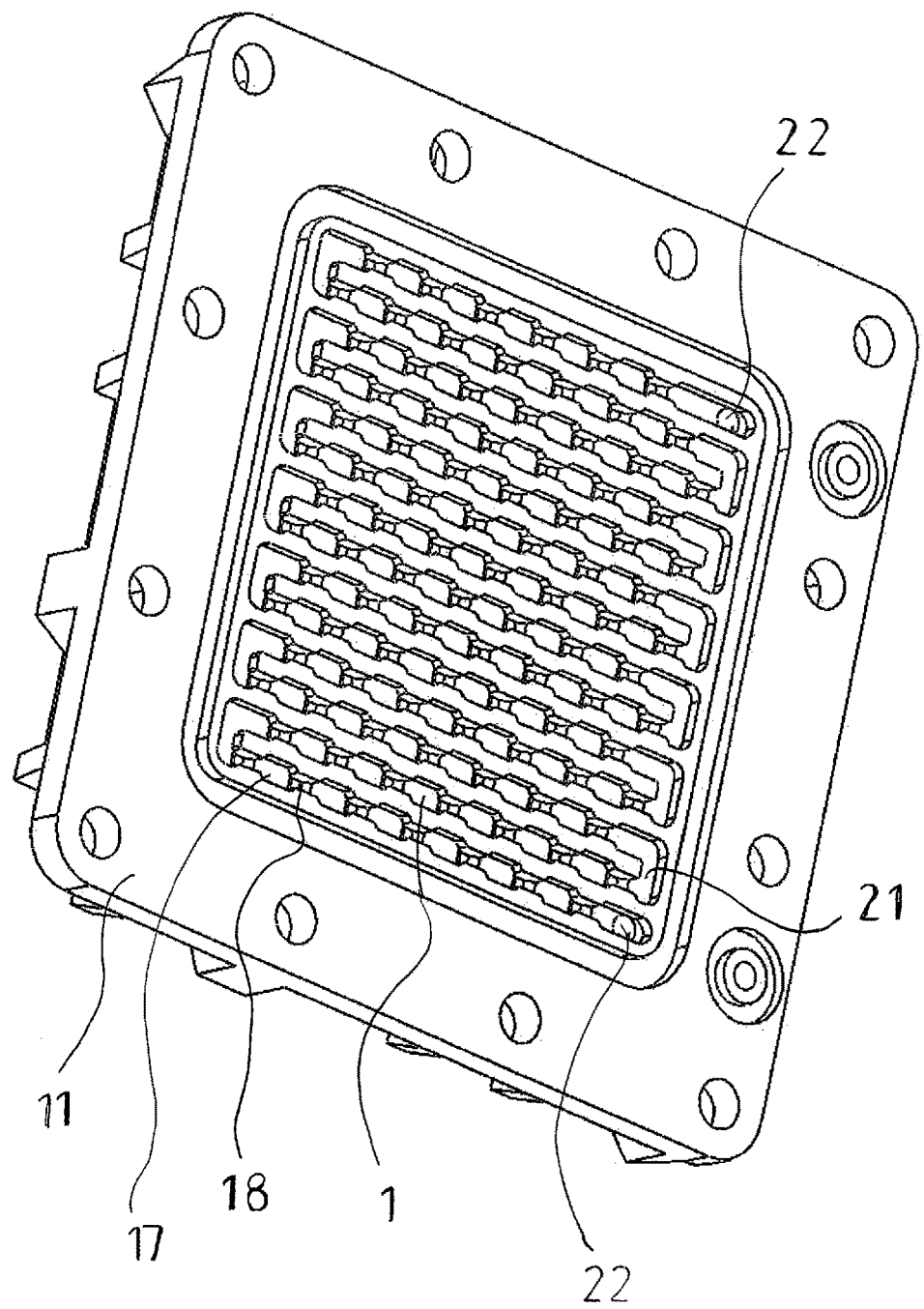
FIG. 18 is a view in perspective of one part of the boiler incorporating a conduit.
Figure 19:
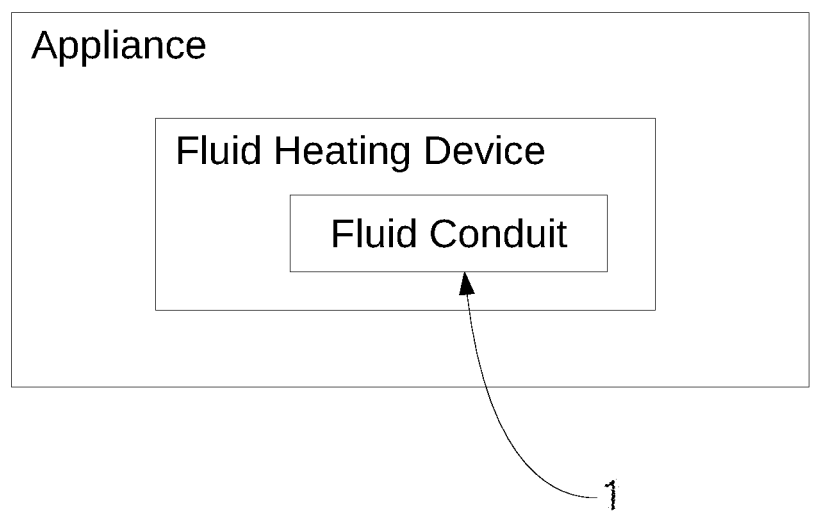
FIG. 19 diagrammatically shows a household applicance, such as a coffee maker, including a fluid heating device that comprises a fluid circulation conduit in accordance with the invention.

FIG. 15 shows more precisely a boiler type device with a body equipped with two flanges 11 joined by assembly means 12 and defining an intermediate volume. In this volume, a flattened central part 23 is inserted and flanges 11 butt up against both sides of this part.

In the nonrestrictive case shown, the central part 23 is equipped with a recess on each side in order to incorporate plate 13. Outer face 15 of each plate 13 is directed towards the face of central part 23. Inner face 14 of each plate is directed in the other direction. This is the level at which heat exchange part 4 described previously takes place.

A preferred embodiment consists in equipping plate 13 with a thick film resistance on its outer face 15. Thermal conduction takes place through plate 13 so as to heat the inner volume of conduit 1.

The volume comprising conduit 1 consists of a hollowed out channel formed in the corresponding flange.

The visible components shown on FIG. 15 are established symmetrically around the mid-plane of central part 23, although this configuration is not restrictive.

FIGS. 16 and 17 show in greater detail the hollowed out channel forming conduit 1. Even though inner face 14 of plate 13 advantageously consists of a flat plane, the shape of the other walls of conduit 1 vary with the capacity to create turbulence.

For the remainder of the description, by depth is meant the dimension of conduit 1 oriented perpendicular to inner face 14. The length or longitudinal direction is oriented in the direction of flow of the fluid to be heated. Lastly, the width corresponds to the remaining dimension. It can be easily understood that the width and the depth determine the section of conduit 1 at any given position along its length.

The changes of section described above in the reference and other embodiments may generally be used to vary the width and/or the depth of conduit 1.

The embodiment on FIGS. 15 to 18 shows an example that associates the changes in width and depth. Apart from the fact that these two dimensions are used to optimize the changes in the fluid flow conditions, this dual variation may be used in order to limit the variations in the dimensional section and to maintain this size constant along conduit 1.

On FIGS. 16 and 17, the wide zones 17 and the deep zones 18 are alternated according to the length of conduit 1. The preferred arrangement is for wide zones 17 to be less deep than deep zones 18 and vice versa concerning the width. Thus, sizes of identical or almost identical section can be achieved despite the shape variations.

According to one possibility, there is a sharp transition between zones 17 and 18.

However, in the case illustrated in FIGS. 15 to 18, the use of transition zones 19, 20 ensures a smoother transition. In greater detail, moving from a wide zone 17, the fluid first encounters a width transition zone 19 that advantageously takes the form of a plane inclined towards the inside of the conduit. There follows a depth transition zone 20, also in the form of an inclined plane, opening into a deep zone 18. It has been noted that this sequence of variations changes the flow streams and forms turbulence without reducing the flows or causing pressure drops.

A single transition zone combining changes in width and depth also falls within the context of this invention.

Below is a preferred example of the dimensions of a conduit 1 with reference to the FIGS. 16 and 17.

P1: 1.5 mm±20%
P2: 2.4 mm±20%
I1: 1.8 mm±20%
I2: 3 mm±20%
L1: 3 mm±20%
L2: 5 mm±20%
Lt: 0.9 mm±20%

This type of conduit 1 can be installed in the device such as shown in FIG. 15 by using a serpentine form, the hollowed out channel of which is created in flange 11 as shown on FIG. 15. Flange 11 comprises a surrounding assembly defining an inner zone in which conduit 1 is formed. Gasket 16 guarantees the tightness of the system (see FIG. 15).

In order to limit the pressure drops, the zones of conduit 1 equipped with the means for creating turbulence may be limited to certain sections depending on the length of the conduit. Moreover, these means for creating turbulence can be evenly spaced along the inside of the conduit.

REFERENCES

1. Conduit
2. Inner volume
3. Stream
4. Heat exchange part
5. Surface projections
6. Hollowed channel
7. Wide section
8. Narrow section
9. Inclined side
10. Body
11. Flange
12. Assembly means
13. Plate
14. Inner face
15. Outer face
16. Gasket
17. Wide zone
18. Deep zone
19. Width transition
20. Depth transition
21. Bend
22. End
23. Central part

The invention claimed is:

1. A device for preparing beverages, comprising:
 a heating device that heats water, comprising a heat exchange part, an electrical resistance, and a plurality of conduit segments in fluid connection with each other and arranged adjacent and parallel to one another such that the plurality of conduits together form an overall serpentine structure with bends connecting ends of adjacent conduits,
 wherein each conduit segment of the conduit segments is configured to direct flow of the water along a longitudinal direction of each conduit segment,
 wherein each conduit segment of the conduit segments has an inner volume delimited by at least one inner wall with surfaces in relief that create turbulence in the water circulating within the inner volume of each conduit segment, and where each conduit segment is also delimited by the heat exchange part, an inner side of the heat exchange part forming another inner wall of the conduit segment, and an outer side of the heat exchange part being opposite the inner side and disposed outside of the inner volume, the electrical resistance being fixed onto the outer side,
 wherein, for each conduit segment of the conduit segments, at least a part of the surfaces in relief is configured to deviate the water away from the longitudinal direction of the conduit segment and towards the inner side of the heat exchange part,
 wherein each one of the conduit segments is in fluid connection with another one of said conduit segments by way of the bends located at the ends of the conduit segments, arranged so that the water follows a continuous, serpentine path through the heating device
 wherein a first plurality of the surfaces in relief comprise sectional variations of the inner volumes of a first plurality of the conduit segments, and wherein the sectional variations comprise at least two zones, a first of the at least two zones being wider and less deep than a second of the at least two zones.

2. The device according to claim 1, wherein the inner side of the heat exchange part is formed as a flat plane.

3. The device according to claim 1, wherein a second plurality of the surfaces in relief comprise surface projections that project towards the inner volume a second plurality of the conduit segments.

4. The device according to the claim 3, wherein the surface projections include studs.

5. The device according to claim 4, wherein the studs have shapes selected from the group consisting of: cylindrical, truncated and pyramidal.

6. The device according to claim 1, wherein the surfaces in relief comprise recessed surfaces that recess into the inner walls of the conduit segments.

7. The device according to claim 1, wherein the sectional variations include variations in width and/or depth of the inner volume.

8. The device according to claim 1, wherein the sectional variations include a succession of sections with different shapes.

9. The device according to claim 1, wherein the at least two zones have a rectangular section.

10. The device according to claim 1, wherein the at least two zones are connected by a transitional section providing width and depth transition.

11. The device according to claim 10, wherein the transitional section comprises a transitional zone in width and a transitional zone in depth.

12. The device according to claim 1, wherein the surfaces in relief are regularly spaced along the longitudinal directions of the conduit segments.

13. The device according to claim 1, wherein the surfaces in relief have inclined sides.

14. The device according to claim 13, wherein the inclined sides have an inclination of between 20° and 60°.

15. The device according to claim 1, wherein the surfaces in relief are formed outside the inner side of the heat exchange part.

16. The device according to claim 1,
 wherein the heat exchange part is a plate, and
 wherein the electrical resistance is a thick film resistance screen-printed on an outer face of the plate.

17. The device according to claim 16, wherein the conduit segments are formed by an assembly of parts comprising a base, hollowed out along the longitudinal direction to form a hollowed out portion that forms the inner wall with surfaces in relief, and a cover, formed by the plate, that covers and encloses the hollowed out portion.

18. The device according to claim 1, wherein, for any one conduit segment of the conduit segments, a section of the inner volume of the conduit segment is less than 10 mm$^2$.

19. The device according to claim 1, wherein, for any one conduit segment of the conduit segments, a section of the inner volume of the conduit segment lies between 3 and 6 mm$^2$.

20. The device according to claim 1, wherein the conduit segments are formed of channels, hollowed out from a base element, and the heat exchange part as a cover element placed on the base element over the channels for enclosing the conduit segments.

21. The device according to claim 20, wherein the surfaces in relief are constituted by structures of said channels hollowed out from the base element, and the cover element is constituted by a plate.

22. A device for preparing beverages, comprising:
a heating device that heats water, the heating device comprising a heat exchange part, an electrical resistance, and first and second channel arrangements,
each of the first and second channel arrangements comprising a plurality of conduit segments, each conduit segment of said conduit segments being configured for directing flow of the water along a longitudinal direction of an inner volume of said conduit segment,
wherein for each of the first and second channel arrangements,
the inner volume of each conduit segment is delimited by a wall formed with surfaces in relief and another wall constituted by an inner facing portion of a heat exchange part,
the surfaces in relief having a configuration that causes turbulence in the water circulating in the inner volume of the conduit segment, at least some of the surfaces in relief being configured to deviate the circulating water away from the longitudinal direction of the conduit segment and towards the inner side of the heat exchange part, and
the heat exchange part having an outer facing side, opposite the inner facing side and disposed outside of the inner volume of the conduit segment, the electrical resistance being fixed onto said outer facing side, and
wherein the first and second channel arrangements are adjacent to one another, an outer facing side of the heat exchange part of the first channel arrangement adjacent and facing an outer facing side of the heat exchange part of the second channel arrangement.

23. The device for preparing beverages according to claim 22, wherein, for each of the first and second channel arrangements,
the surfaces in relief comprise surface projections that project towards an interior of the inner volumes of the conduit segments, and
the inner side of the heat exchange part is formed as a flat plane facing the wall formed with surfaces in relief.

24. The device for preparing beverages according to claim 22, wherein, for each one of the first and second channel arrangements,
each one of said conduit segments is in fluid connection with another one of said conduit segments by way of a bend, arranged so that the water follows a continuous, serpentine path through the heating device.

25. The device for preparing beverages according to claim 22, wherein, for each one of the first and second channel arrangements,
each one of said conduit segments is arranged adjacent and parallel to one another and is in fluid connection with another one of said conduit segments so as to form a serpentine path through the heating device.

26. The device for preparing beverages according to claim 22, wherein the surfaces in relief comprise sectional variations in at least one of width and depth of the inner volume of the conduit segments.

* * * * *